United States Patent [19]
Xydis

[11] Patent Number: 6,070,240
[45] Date of Patent: May 30, 2000

[54] COMPUTER ACCESS CONTROL

[75] Inventor: Thomas G. Xydis, Ann Arbor, Mich.

[73] Assignee: Ensure Technologies Incorporated, Ann Arbor, Mich.

[21] Appl. No.: 08/920,544

[22] Filed: Aug. 27, 1997

[51] Int. Cl.[7] .............................. G06F 11/00; H04L 9/00
[52] U.S. Cl. ............................................. 713/200; 380/25
[58] Field of Search .............................. 395/186, 187.01, 395/188.01, 182.16, 183.06, 183.13, 183.15, 185.01; 380/23, 25, 26, 44; 340/571, 500, 540, 825.37, 825.08, 825.31, 825.34; 714/20, 25, 39, 47; 713/200, 201, 202; 364/286.4

[56] References Cited

U.S. PATENT DOCUMENTS

| | | | |
|---|---|---|---|
| 4,837,568 | 6/1989 | Snaper | 340/825 |
| 4,846,233 | 7/1989 | Fockens | 141/94 |
| 4,893,118 | 1/1990 | Lewiner et al. | 340/825.54 |
| 4,951,249 | 8/1990 | McClung et al. | 364/900 |
| 4,980,913 | 12/1990 | Skret | 380/23 |
| 5,113,183 | 5/1992 | Mizuno et al. | 340/825.31 |
| 5,131,038 | 7/1992 | Puhl et al. | 380/23 |
| 5,202,929 | 4/1993 | Lemelson | 382/2 |
| 5,343,529 | 8/1994 | Goldfine et al. | 380/23 |
| 5,406,261 | 4/1995 | Glenn | 340/571 |
| 5,408,536 | 4/1995 | Lemelson | 382/2 |
| 5,477,215 | 12/1995 | Mandelbaum | 340/825.34 |
| 5,493,283 | 2/1996 | Hopper et al. | 340/825.31 |
| 5,563,579 | 10/1996 | Carter | 340/539 |
| 5,583,486 | 12/1996 | Kersten | 340/568 |
| 5,615,277 | 3/1997 | Hoffman | 382/115 |
| 5,629,981 | 5/1997 | Nerlikar | 380/25 |
| 5,630,057 | 5/1997 | Hait | 395/186 |
| 5,668,929 | 9/1997 | Foster, Jr. | 704/273 |
| 5,736,935 | 4/1998 | Lambropoulos | 340/825.69 |
| 5,748,084 | 5/1998 | Isikoff | 340/568 |
| 5,836,010 | 11/1998 | Kim | 395/186 |
| 5,841,868 | 11/1998 | Helbig, Sr. | 380/25 |
| 5,892,901 | 4/1999 | Landwehr et al. | 395/186 |

FOREIGN PATENT DOCUMENTS

| | | |
|---|---|---|
| 2157132 | 4/1985 | United Kingdom . |
| 2197734 | 11/1987 | United Kingdom ............ G06F 12/14 |
| 2257278 | 6/1992 | United Kingdom ........... G08B 13/00 |

OTHER PUBLICATIONS

Want et al, Active Badges and personal interactive computing objects, IEEE Trans. on conusmer electronics, vol. 38, No. 1, pp. 10–20, Feb. 1992.

Alain Izad, Xilinx circuit gives versatility and size reduction to portable electronic radio frequecy Tag reader, IEEE Trans, on consumer electronics, pp. 390–391, Jun. 1992.

Primary Examiner—Robert W. Beausoliel, Jr.
Assistant Examiner—Nadeem Iqbal
Attorney, Agent, or Firm—Howard & Howard

[57] ABSTRACT

A method of controlling a computer (12) system (10) comprising the steps of: disposing a computer (12) in an operating space and placing the computer (12) in a lockout mode to prevent operation of the computer (12) software by a user. A database (26) of authorized user codes is compiled in the computer. A transponder (20) places a first authorized user code in the operating space and a transceiver (18) scans the operating space for the presence of a transponder transmitting an authorized user code and senses the presence of the first authorized user code in the operating space. A comparator (29) compares the first authorized user code to the database (26) for verification to unlock the computer (12) for use by the first authorized user in response to sensing the authorized user code in the operating space. The authorized user then is free to operate the computer software while the sensing for the presence of a transponder (20) transmitting an authorized user code in the operating space is continued. The computer (12) is relocked in the lockout mode at the termination of the first authorized user code by removing the transponder from the operating space and locking the software in a re-lockout operational status at the time of relocking to prevent operation of the computer (12) software by a user.

11 Claims, 5 Drawing Sheets

6,070,240

COMPUTER ACCESS CONTROL

BACKGROUND OF THE INVENTION

1. Field of the Invention

The subject invention relates to a method of controlling a computer system, and, more specifically, to a method of authenticating authorized users of the computer system.

2. Description of the Prior Art

Various systems are known for controlling the operation of a computer system. One such system is disclosed in U.S. Pat. No. 5,202,929 to Lemelson wherein physical characteristics of a user are automatically analyzed and compared to the characteristics of authorized users. The computer is enabled and disabled as the authorized user comes and goes. Another system is disclosed in U.S. Pat. No. 5,131,038 to Puhl et al. wherein verification of the authorized user is accomplished by communication between radio frequency transceivers.

SUMMARY OF THE INVENTION AND ADVANTAGES

A method of controlling a computer system comprising the steps of: disposing a computer in an operating space; supplying operating power to the computer; and placing the computer in a lockout mode to prevent operation of the computer software by a user. A database of authorized user codes is compiled and a first authorized user code is placed in the operating space. The operating space is scanned for the presence of an authorized user code and the presence of the first authorized user code is sensed in the operating space. The first authorized user code is compared to the database for verification and the computer is unlocked for use by the first authorized user in response to sensing the authorized user code in the operating space. The sensing for the presence of the first authorized user code in the operating space continues as the operation of the computer software by the authorized user is taking place. A relocking the computer in the lockout mode occurs at the termination of the first authorized user code in the operating space as well as a locking of the software in a re-lockout operational status at the time of relocking to prevent operation of the computer software by a user. The method is distinguished by a re-unlocking of the computer in response to sensing the first authorized user code upon re-introduction of the first authorized user code into the operating space and at the re-lockout operational status of the software whereby the authorized user may continue operation of the computer in the mode at which the first authorized user code was removed from the operating space.

Accordingly, the subject invention provides a method of not only placing a computer system in a lockout mode but also unlocking the computer in response to re-entry of the authorized user carrying an authorized user code into the computer space and in the operational status of the software at which the computer was placed in the lockout mode by the absence of the authorized user code. Therefore, the computer automatically goes to the lockout mode when the user leaves the computer space and automatically unlocks to the same place when that same user re-enters the computer space whereby the user is relieved of completely re-negotiating with the computer for access to the desired software program.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
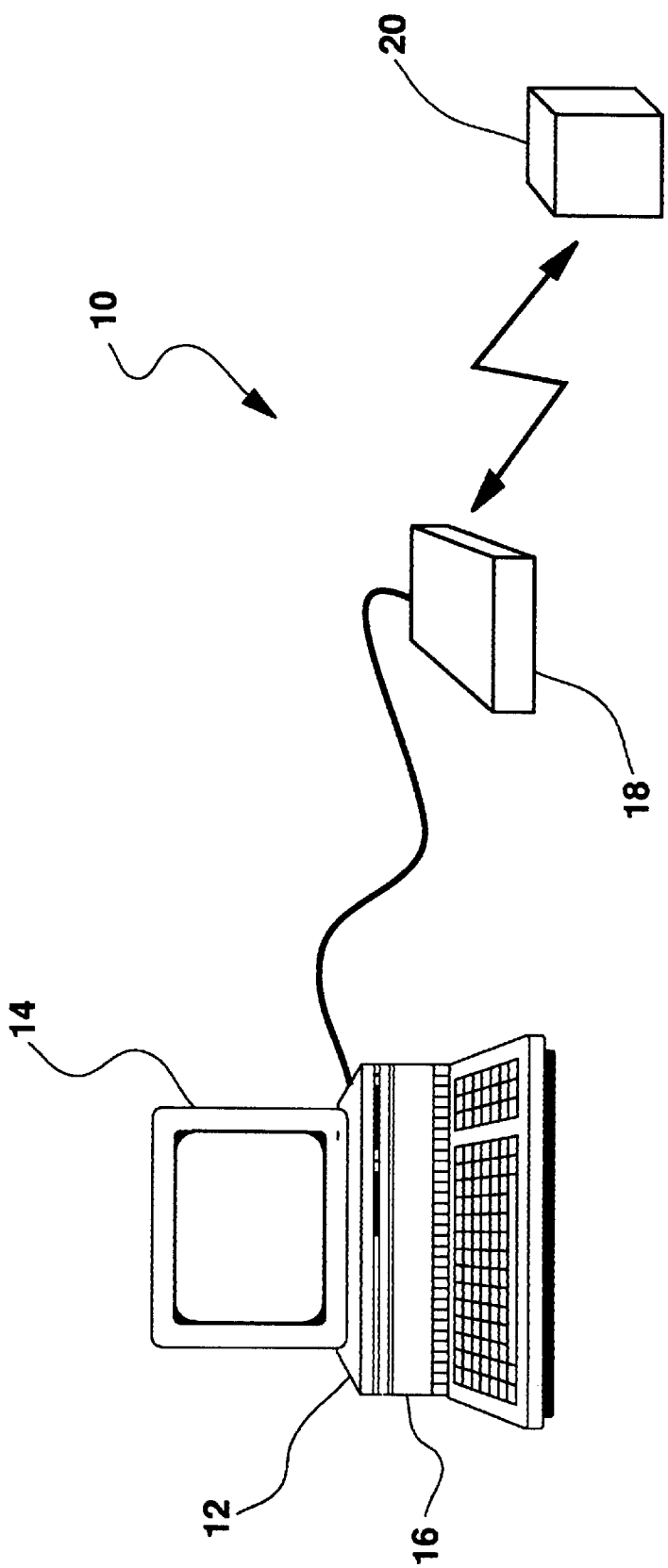
FIG. 1 is a schematic view showing a computer system employed in the subject invention.

Referring to the Figures, wherein like numerals indicate like or corresponding parts throughout the several views, a computer system is generally shown at 10 in FIG. 1 for executing and the subject invention includes a method of controlling the computer system 10.

The system 10 includes a computer 12 operatively connected to a monitor 14 and a keyboard 16. The computer 12 is disposed in an operating space which is limited to the space in which an operator would normally remain while operating the computer 12. Electrical power is supplied to the computer 12 through a switch 19 from an electrical outlet in the customary manner.

The system 10 also includes a radio frequency transceiver 20 and a radio frequency transponder 22. The transceiver 20 may be internal or external to the computer 12 and transmits a radio frequency signal for scanning the operating space surrounding the computer 12.

Figure 2:
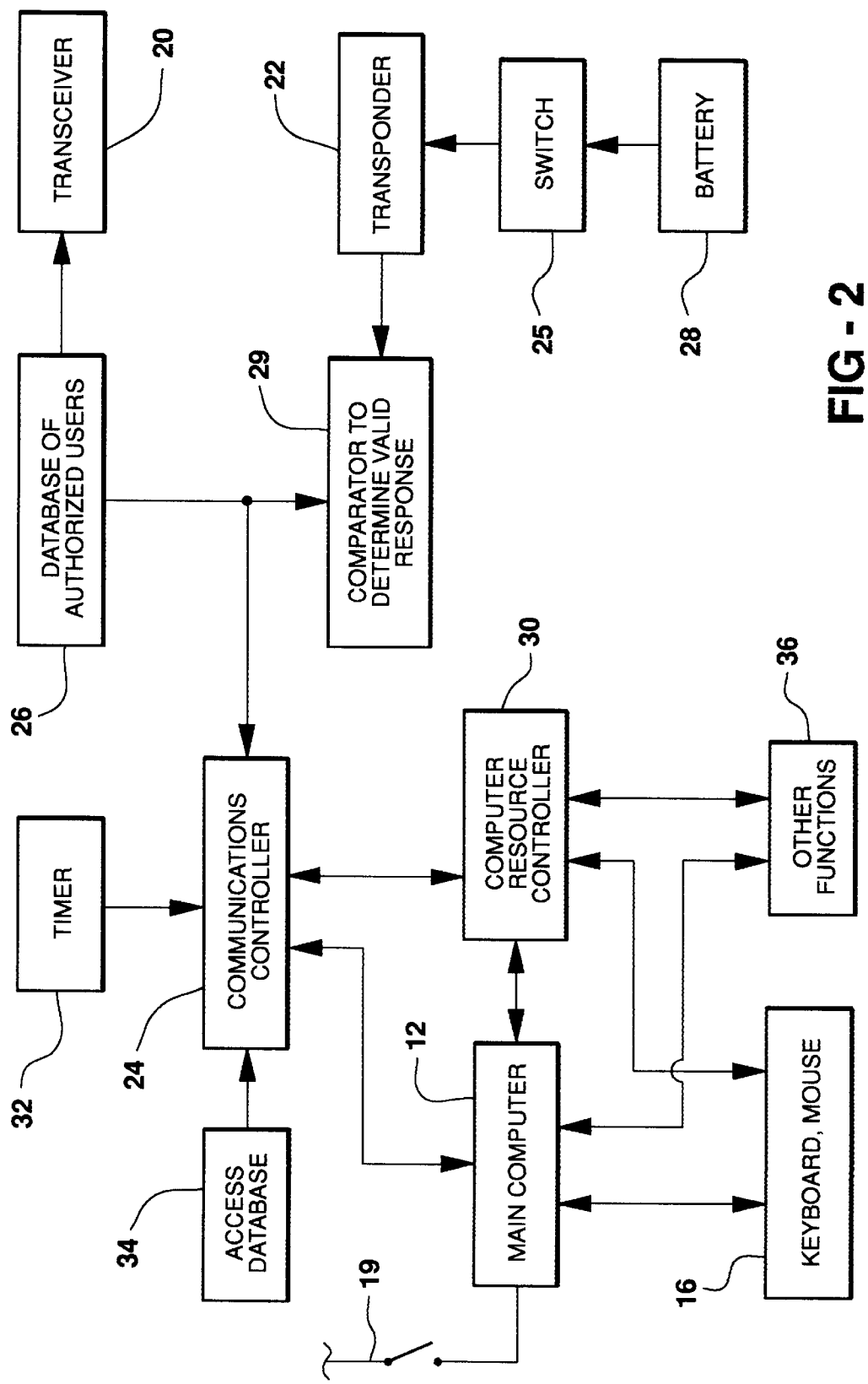
FIG. 2 is a block diagram of the components of the subject invention.

A schematic of the system 10 is shown in FIG. 2. The computer 12 has the normal power switch 19 for supplying electrical operating power to the computer 12. A communications controller 24 places the computer 12 in a lockout mode to prevent operation of the computer 12 software by any user. The lockout mode is selectable in the computer 12 software. In the preferred lockout mode, the keyboard 16, including the mouse, are disabled and the monitor 14 screen is blanked (e.g., a message or a screen saver), leaving the computer 12 free to function. This allows other operations to continue when in the lockout mode, such as printing and downloads. In addition, remote control of the computer 12 would be prevented in the lockout mode.

The computer 12 includes a database 26 of authorized user codes which is compiled and placed in the computer 12 by an authorized authority, i.e., a supervisor or control person. Normally, a specific code is inserted into the database 26 for each individual user and the database 26 could comprise one or more codes.

The transponder 22 places a specific authorized user code in the operating space surrounding the computer 12. In the preferred embodiment, the transponder 22 is a radio frequency transmitter which contains one authorized user code. In other words, each authorized user is issued a transponder 22 with that person's specific user code. The method includes scanning the operating space for the presence of an authorized user code and sensing the presence of the first authorized user code in the operating space. The scanning of the operating space is further defined as transmitting a radio frequency signal from the radio frequency transceiver 20. The sensing of the radio frequency signal is further defined as placing a transponder 22 in the operating space and energizing the transponder 22 to send a response radio frequency signal carrying the first authorized user code, and receiving the response radio frequency at the transceiver 20. The energizing of the transponder 22 is further defined as switching by a switch 27 controlling a source of energy, e.g., battery 28, on the transponder 22 to the normally off condition and switching the source of energy to the on condition only in response to the radio signal from the transceiver 20. In the preferred embodiment, the transceiver 20 transmits a radio frequency signal which is lead by a wake-up signal which initiates a wake-up circuit on the transponder 22 to switch energy on from a small battery 28 carried by the transponder 22. Therefore, the energizing of the transponder 22 may be defined as activating circuitry in the transponder 20 needed to process a signal received from the transceiver 20 and to respond to it. This circuitry is only activated in response to a radio signal from the transceiver 20. In the preferred embodiment, the transceiver 20 transmits a radio frequency signal of which the first part is a wake-up signal. This wake-up signal initiates a wake-up circuit which switches the transponder 22 from a low current state (in which it is only capable of receiving and recognizing a wake-up signal) and a high current state in which it can process the signal from the transceiver 20, and responding accordingly.

Alternatively, the transponder 22 may transmit a radio frequency signal on a periodic basis (whenever it is activated by the user) and the transceiver 20 merely looks for the signal. Also, the transponder 22 may send an initiation signal into the computer 12 and wherein the scanning the operating space is further defined as scanning the operating space only in response to this initiation signal. Instead of a radio signal, the transceiver 20 may communicate with the transponder 22 via an infrared light frequency signal.

The computer 12 includes a comparator 29 for comparing the first authorized user code to the database 26 for verification, i.e., the first transponder 22 to enter the operating space. The comparator 29 compares the authorized user code transmitted by the transponder 22 and received by the transceiver 20 to the database 26 of authorized users. When that first authorized user code matches a code stored in the database 26, the communications controller 24 unlocks the computer 12 for use by the first authorized user in response to that sensing of the authorized user code in the operating space.

The manner in which the authorization occurs is selectable in the initial setup of the system. Upon authorization the computer 12 may just boot up. In other words, an authorized user must be present when the computer 12 is turned on by the switch 27 before the computer 12 will boot up. Alternatively, the computer 12 may boot up upon being powered by closing the switch 27 but stops at a log in screen and scans the operating space only when a user attempts to log in. In this case, the scanner will only look for that user who logged in as controlled by the communications controller 24. The method, therefore, includes the step of logging into the computer 12 by the first authorized user and wherein the scanning of the operating space is further defined as scanning the operating space only for the presence of the first authorized user code in response to the logging in by the first authorized user.

Once the authorized user is identified, operation of the computer 12 software by the authorized user may freely occur. However, the method includes the step of continuing the sensing for the presence of that first authorized user code in the operating space. And, in the event of termination of the first authorized user code in the operating space, a re-locking the computer 12 in the lockout mode occurs by the communications controller 24. At this time of relocking, a locking of the software in a re-lockout operational status is accomplished by a computer resource controller 30 to prevent operation of the computer 12 software by a user. Accordingly, the computer 12 locks out when an authorized user using the computer 12 leaves the operating space, i.e., more specifically, when the authorized user's transponder 22 leaves the operation space, the computer 12 is placed in the lockout mode.

The sensing for the presence of the first authorized user code in the operating space is further defined as sensing for predetermined periods of time separated by predetermined periods of time of non-sensing. This is controlled by a timer 32 connected to the communications controller 24. This sensing continues after the authorized transponder 22 has been removed from the operation space.

Dependent upon the initial system setup, it may be required for the user to tap the space bar to regain access. This would prevent a computer from scanning for a user all night or for weeks while the user is on vacation. It can operate by scanning for the user as the user is using the computer, but, if the user leaves the computer space for more than a predetermined time interval, the computer would stop searching for the user until the user performs a simple key action, such as depressing a key. The computer would again search for the user's transponder and only grant access it the user's code was present. A simple message could be printed on the screen, such as "DEPRESS THE SPACE BAR FOR ACCESS". The software also includes the ability to allow a supervisor to review and monitor the applications or processes an authorized user is using or used.

The method includes the step of re-unlocking the computer 12 in response to sensing the first authorized user code upon re-introduction of the first authorized user code into the operating space and at the re-lockout operational status of the software whereby the authorized user may continue operation of the computer 12 in the mode at which the first authorized user code was removed from the operating space. In other words, an authorized user may leave the operating space with the transponder 22 and upon re-entry, the computer 12 will unlock at the same operational status or mode in which it was placed in the lockout mode.

The method may also include the compiling of an access database 34 to link each of the authorized users to a predetermined array software for access upon unlocking of the computer 12. In other words, the array or designated software programs accessible by one authorized user may be different from the array or designated software programs accessible by another authorized user.

The system 10 may also include other functions 36, such as a scanner, printer, etc.

Figure 3:
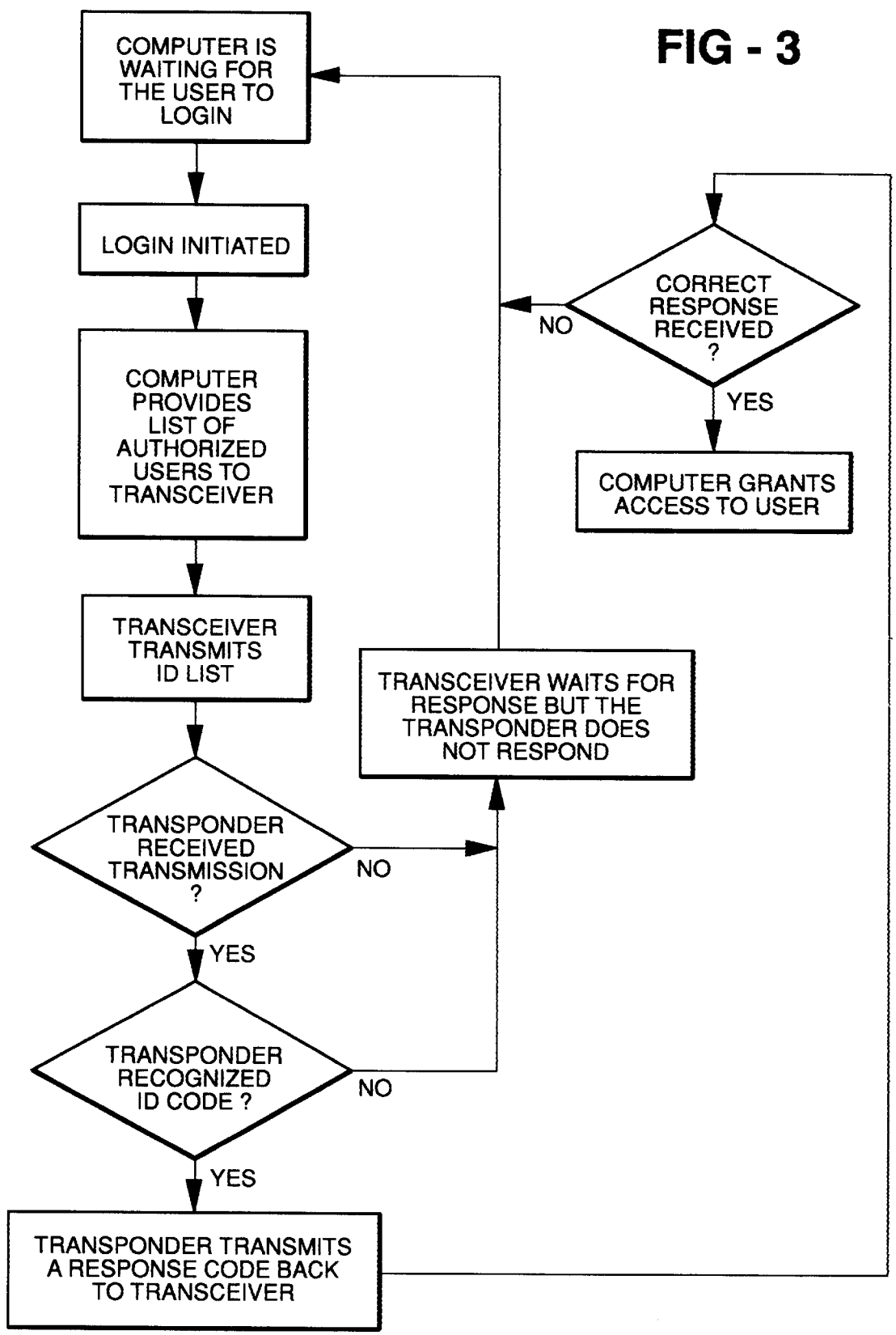
FIG. 3 is a flow diagram showing one sequence of the steps of the subject invention.
Figure 4:
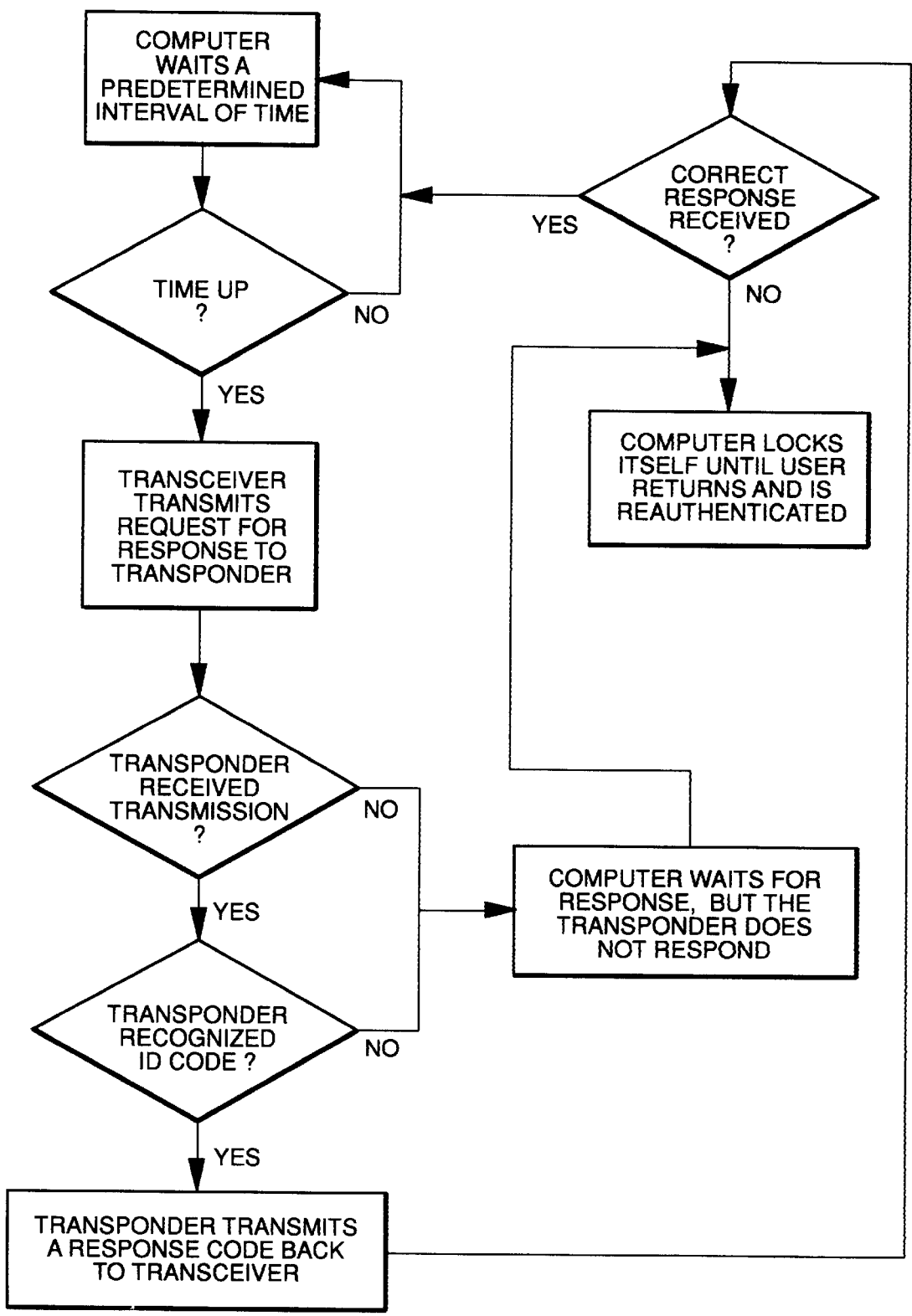
FIG. 4 is a flow diagram showing another sequence of the steps of the subject invention.
Figure 5:
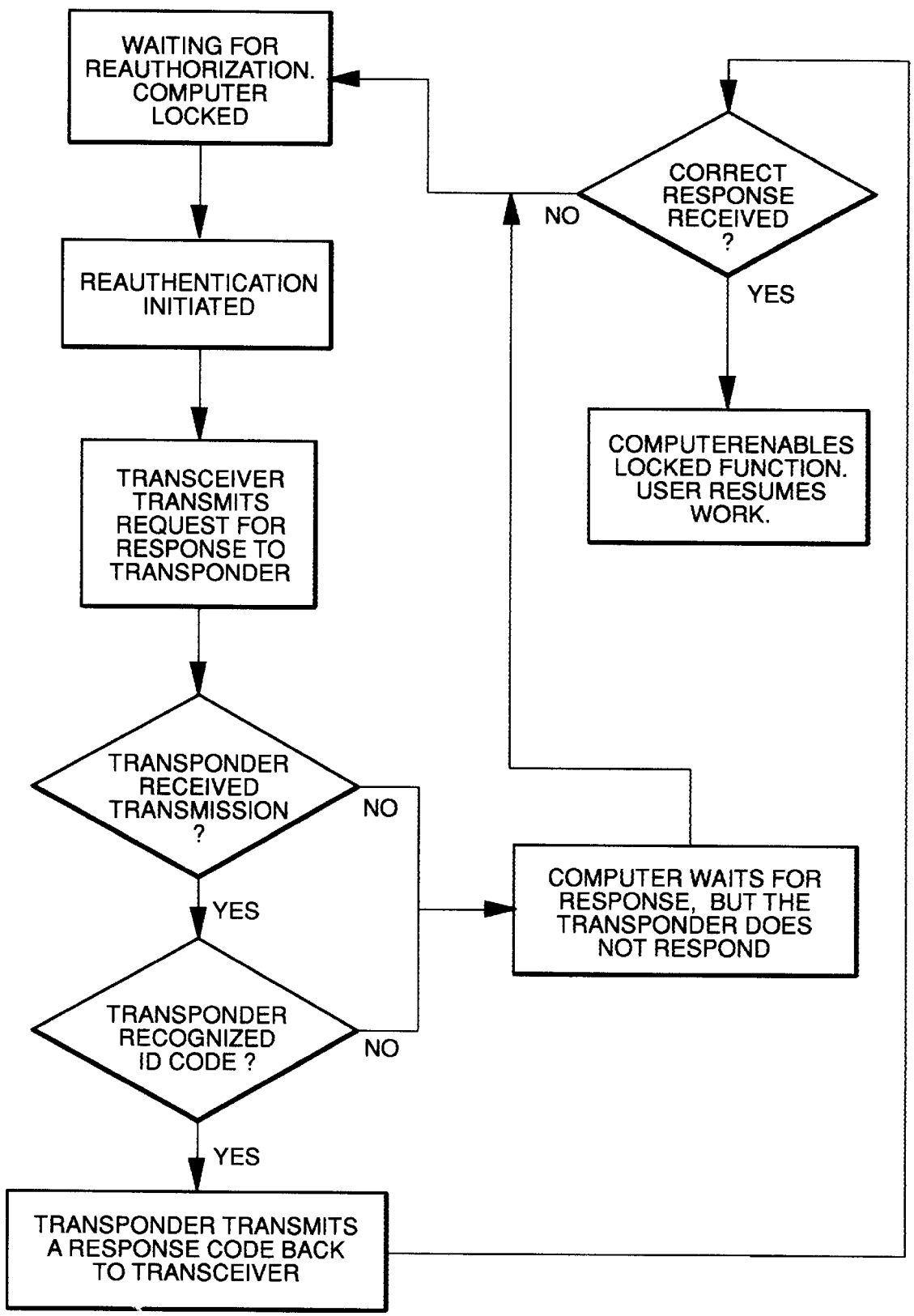
FIG. 5 is a flow diagram showing yet another sequence of the steps of the subject invention.

The flow charts depicted in FIGS. 3 through 5 show operation of the system 10 and steps of the method.

As to initial authorization, three basic options exist. In the first, the system 10 merely looks for the authorized user code to boot up. When the computer 12 is first turned on by the switch 27, an authorized user code must be present in the operating space for the computer 12 to boot up. If the computer 12 is powered up and cannot find an authorized user code for a predetermined length of time as established by the timer 32, then an error message may appear on the monitor 14 and the transceiver 20 stops scanning for a transponder 22. A sample message might be "press space key for access". Alternatively, the computer 12 is allowed to boot up when the power switch 27 is closed without an authorized user code present in the operating space, but stops at the log in screen on the monitor 14. The transceiver 20 only begins to scan the operating space when a user tries to log in. In response to the log in, the transceiver 20 will only scan for the user code assigned to the person who logged in, i.e., it will not use the entire list of authorized users in the database 26. Yet another initiation procedure is to allow the computer 12 to just boot up to the locked out mode whereupon the transceiver 20 merely scans for an authorized user code.

The sequence of FIG. 4 shows how the computer 12 verifies that the authorized user code remains in the operating space. The sequence of FIG. 5 illustrates how an authorized user gets back into the computer 12 after the computer 12 is in the lockout mode. The unlocking from the lockout mode is software selectable. One option is for the transceiver 20 to continually scan the operating space. Another option is for the scanning to continue in response to depression of one or more keyboard 16 keys. In this case, the transceiver 20 may scan only for the last authorized user code. It is important, however, that the computer 12 will unlock and return to the same operational mode in which it was placed in the lockout mode so that the authorized user takes up where the user left off. Furthermore, multiple authorized users may be running independent sessions on the same computer 12 with each authorized user having access via the access database 34 only to authorized software and programs.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of controlling a computer (12) system (10) comprising the steps of:

disposing a computer (12) in an operating space;

supplying operating power to the computer (12);

placing the computer (12) in a lockout mode to prevent operation of the computer (12) software by a user;

compiling a database (26) of authorized user codes;

placing a first authorized user code in the operating space;

scanning the operating space for the presence of an authorized user code and sensing the presence of the first authorized user code in the operating space;

comparing the first authorized user code to the database (26) for verification;

unlocking the computer (12) for use by the first authorized user in response to sensing the authorized user code in the operating space;

operating the computer software by the authorized user;

continuing the scanning of the operating space only for the presence of the first authorized user code in the operating space without scanning for other authorized user codes in the database;

relocking the computer (12) in the lockout mode at the termination of the first authorized user code in the operating space and locking the software in a re-lockout operational status at the time of relocking to prevent operation of the computer (12) software by a user; and re-unlocking the computer (12) in response to sensing the first authorized user code upon re-introduction of the first authorized user code into the operating space and the re-lockout operational status of the software whereby the authorized user may continue operation of the computer (12) in the mode at which the first authorized user code was removed from the operating space.

2. A method as set forth in claim 1 wherein the continuing the sensing for the presence of the first authorized user code in the operating space is further defined as sensing for predetermined periods of time separated by predetermined periods of time of non-sensing.

3. A method as set forth in claim 1 including the step of logging into the computer (12) by the first authorized user and wherein the scanning of the operating space only for the presence of the first authorized user code is in response to the logging in by the first authorized user.

4. A method as set forth in claim 1 including the step of sending an initiation signal into the computer (12) and wherein the scanning the operating space is further defined as scanning the operating space only in response to the initiation signal.

5. A method as set forth in claim 1 compiling an access database (34) to link each of the authorized users to a predetermined array software for access upon unlocking of the computer (12).

6. A method as set forth in claim 1 placing a radio frequency transceiver (20) on the computer (12) and wherein the scanning of the operating space is further defined as transmitting a radio frequency signal from the radio frequency transceiver (20).

7. A method as set forth in claim 6 wherein the sensing of the radio frequency signal is further defined as placing a transponder (22) in the operating space and energizing the transponder (22) to send a response radio frequency signal carrying the first authorized user code, and receiving the response radio frequency at the transceiver (20).

8. A method as set forth in claim 7 wherein the energizing of the transponder (22) is further defined as switching a source of energy on the transponder (22) to the normally off condition and switching the source of energy to the on condition only in response to the radio signal.

9. A method as set forth in claim 1 placing an infrared frequency transceiver (20) on the computer (12) and wherein the scanning of the operating space is further defined as transmitting an infrared frequency signal from the transceiver (20).

10. A method as set forth in claim 9 wherein the sensing of the infrared frequency signal is further defined as placing a transponder (22) in the operating space and energizing the transponder (22) to send a response infrared frequency signal carrying the first authorized user code, and receiving the response infrared frequency at the transceiver (20).

11. A method as set forth in claim 10 wherein the energizing of the transponder (22) is further defined as switching a source of energy on the transponder (22) to the normally off condition and switching the source of energy to the on condition only in response to the infrared signal.

* * * * *